United States Patent
Kita et al.

(10) Patent No.: US 12,508,636 B2
(45) Date of Patent: *Dec. 30, 2025

(54) METHOD FOR TREATING SOLID HAZARDOUS HEAVY METAL-CONTAINING COMPOSITIONS

(71) Applicant: Yara International ASA, Oslo (NO)

(72) Inventors: Patrycja Kita, Poznan (PL); Tanja Vojnovic, Skien (NO); Lene Sund, Porsgrunn (NO); Katrine Lie Bøyesen, Skien (NO); Tom Rames Jørgensen, Porsgrunn (NO)

(73) Assignee: YARA INTERNATIONAL ASA, Oslo (NO)

( * ) Notice: Subject to any disclaimer, the term of this patent is extended or adjusted under 35 U.S.C. 154(b) by 378 days.

This patent is subject to a terminal disclaimer.

(21) Appl. No.: 18/008,849

(22) PCT Filed: Jun. 16, 2021

(86) PCT No.: PCT/EP2021/066244
§ 371 (c)(1),
(2) Date: Dec. 7, 2022

(87) PCT Pub. No.: WO2021/255096
PCT Pub. Date: Dec. 23, 2021

(65) Prior Publication Data
US 2023/0218940 A1    Jul. 13, 2023

(30) Foreign Application Priority Data

Jun. 16, 2020 (EP) .................................. 20180341

(51) Int. Cl.
*B09B 3/80* (2022.01)
*A62D 3/33* (2007.01)
(Continued)

(52) U.S. Cl.
CPC .................. *B09B 3/80* (2022.01); *A62D 3/33* (2013.01); *A62D 3/36* (2013.01); *B09B 3/21* (2022.01);
(Continued)

(58) Field of Classification Search
None
See application file for complete search history.

(56) References Cited

U.S. PATENT DOCUMENTS 4,308,214 A    12/1981  Robertson
4,334,074 A    6/1982   Peterson
(Continued)

FOREIGN PATENT DOCUMENTS

CN    1036745    11/1989
CN    1109025    9/1995
(Continued)

OTHER PUBLICATIONS

Machine translation of WO-2014038537-A1, pp. 1-14. (Year: 2014).*
(Continued)

*Primary Examiner* — Clare M Perrin
(74) *Attorney, Agent, or Firm* — DILWORTH IP, LLC

(57) ABSTRACT

A method comprising a) mixing and dissolving the solid hazardous heavy metal-containing composition with an acid solution; b) precipitating the heavy metal from the hazardous heavy metal acid compositions by; c) precipitating the heavy metal from the hazardous heavy metal acid composition with a heavy metal-precipitation agent; and d) separating out the heavy metal precipitate from the aqueous supernatant, whereby the heavy metal-precipitation agent comprises a diorgano-dithiophosphinic acid or the alkali metal or ammonia salts thereof.

(Continued)

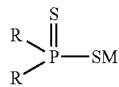

14 Claims, 1 Drawing Sheet

(51) Int. Cl.
| | |
|---|---|
| A62D 3/36 | (2007.01) |
| B09B 3/21 | (2022.01) |
| B09B 3/70 | (2022.01) |
| C01B 25/238 | (2006.01) |
| C02F 1/26 | (2023.01) |
| C02F 1/68 | (2023.01) |
| C02F 11/14 | (2019.01) |
| C22B 3/26 | (2006.01) |
| C22B 3/38 | (2006.01) |
| A62D 101/43 | (2007.01) |
| B01D 21/01 | (2006.01) |
| B03D 3/06 | (2006.01) |
| C02F 1/56 | (2023.01) |
| C02F 9/00 | (2023.01) |
| C02F 101/20 | (2006.01) |

(52) U.S. Cl.
CPC .............. B09B 3/70 (2022.01); C01B 25/238 (2013.01); C02F 1/26 (2013.01); C02F 1/683 (2013.01); C02F 11/14 (2013.01); C22B 3/26 (2021.05); C22B 3/382 (2021.05); A62D 2101/43 (2013.01); B01D 21/01 (2013.01); B03D 3/06 (2013.01); C02F 1/56 (2013.01); C02F 9/00 (2013.01); C02F 2101/20 (2013.01); C02F 2209/06 (2013.01)

(56) References Cited

U.S. PATENT DOCUMENTS

| | | | |
|---|---|---|---|
| 4,378,340 | A | 3/1983 | Berglund |
| 4,437,997 | A | 3/1984 | Dobry |
| 4,479,924 | A * | 10/1984 | von Plessen ......... C01G 21/003 423/100 |
| 4,584,111 | A | 4/1986 | Collett |
| 4,634,580 | A | 1/1987 | Jdid |
| 4,762,693 | A | 8/1988 | Schimmel |
| 4,986,970 | A * | 1/1991 | Haraldsen ............... C22B 17/04 423/321.1 |
| 5,173,280 | A | 12/1992 | Rey |
| 5,378,262 | A | 1/1995 | Mihaylov et al. |
| 5,656,175 | A | 8/1997 | Bossier |
| 2004/0136889 | A1 | 7/2004 | Bonath |
| 2004/0179984 | A1 | 9/2004 | Nagaraj |
| 2012/0193296 | A1 | 8/2012 | Bhaduri |
| 2019/0106324 | A1* | 4/2019 | Zhang .................. C01B 25/238 |

FOREIGN PATENT DOCUMENTS

| | | | |
|---|---|---|---|
| CN | 1109913 | A | 10/1995 |
| CN | 101560004 | | 10/2009 |
| CN | 104478060 | | 4/2015 |
| CN | 105944451 | | 9/2016 |
| CN | 206624725 | | 11/2017 |
| CN | 109205846 | | 1/2019 |
| DE | 3209183 | A1 | 9/1983 |
| DE | 3502215 | | 7/1986 |
| EP | 0039119 | | 11/1981 |
| EP | 0091043 | A1 | 10/1983 |
| FI | 830270 | | 7/1983 |
| FR | 2870229 | | 11/2005 |
| RU | 2386592 | C2 | 4/2010 |
| WO | 8908075 | | 9/1989 |
| WO | 2004083118 | | 9/2004 |
| WO | 2011154991 | | 12/2011 |
| WO | WO-2014038537 | A1 * | 3/2014 ............... C02F 1/56 |
| WO | 2019071108 | | 4/2019 |

OTHER PUBLICATIONS

International Preliminary Report on Patentability issued in App. No. PCT/EP2021/066244, mailing date Apr. 8, 2022, 16 pages.
International Search Report and Written Opinion issued in App. No. PCT/EP2021/066244, mailing date Oct. 6, 2021, 13 pages.
International Search Report and Written Opinion issued in App. No. PCT/EP2021/066246, mailing date Oct. 6, 2021, 12 bages.
Swe Swe Mar & Masanori Okazaki, Microchemical Journal 104 (17-21), Sep. 2012.
International Search Report and Written Opinion issued in App. No. PCT/EP2021/066174, mailing date Oct. 13, 2021, 12 pages.
International Preliminary Report on Patentability issued in App. No. PCT/EP2021/066179, mailing date Mar. 16, 2022, 14 pages.
Xu Zhaoxi, Heavy metal removal by wet phosphoric acid precipitation method, Inorganic Salt Industry, No. 02, Apr. 20, 1989, 4 pages.
He Zhiru, Li Ning, Research on wastewater treatment technology for storage battery production, Environmental Science and Management, No. 12, Dec. 15, 2011.
English translation of Chinese Office Action issued in App. No. CN202180028802, dated Sep. 8, 2023, 18 pages.
Chinese Office Action (including English translation) issued in App. No. CN202180028835, dated Jan. 13, 2024, 26 pages.
English translation of Chinese Office Action issued in App. No. CN202180028802, dated Jan. 11, 2024, 15 pages.
English translation of Chinese Office Action issued in App. No. CN202180034830, dated Jan. 17, 2024, 13 pages.
Office Action (including English translation) issued in App. No. EA20229299328, dated May 20, 2024, 10 pages.
English translation of Chinese Office Action issued in App. No. CN202180028835, dated Sep. 8, 2023, 17 pages.
English Abstract of EP0085344 (A2), corresponding to FI 830270, Hoechst Ag.
Jing et al., "Port Environmental Pollution Control Technology", Ocean Press, Nov. 30, 2007, 4 pages.
Office Action and Search Report received for Chinese Application No. 202180034903, mailed on Feb. 15, 2025, 18 pages (8 pages of original office action and 10 pages of English Translation).

* cited by examiner

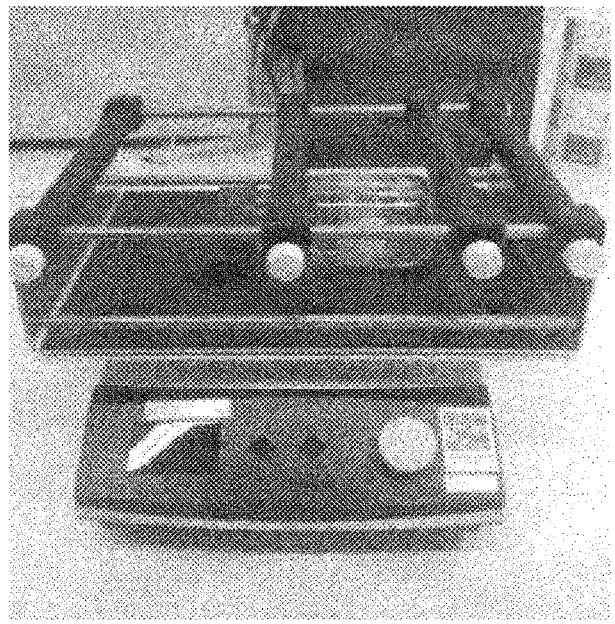

METHOD FOR TREATING SOLID HAZARDOUS HEAVY METAL-CONTAINING COMPOSITIONS

FIELD OF THE INVENTION

The present disclosure relates to the field of treating solid hazardous heavy metal-containing compositions.

BACKGROUND

Heavy metals such as cadmium, copper, nickel, lead, zinc and mercury are considered unacceptable above a certain level, depending on the application, because of their toxicity and they thus have to be either completely removed or their levels have to be reduced significantly. Many processes have been developed over the years for their removal.

For example, cadmium is a naturally occurring element in the earth's crust. In particular, the phosphate rock extracted from phosphate mines typically contains cadmium at levels between 0.15 to 507 mg/kg of phosphate rock having an average phosphorous ($P_2O_5$) content of about 30 weight % (Swe Swe Mar & Masanori Okazaki, Microchemical Journal 104 (17-21), September 2012). Unless cadmium is removed from the phosphate rock prior to its processing in or during the nitro-phosphate process, the fertilizers resulting from the process will contain cadmium. Some forms of cadmium can be taken up by plants and, thereby, end up in the food chain. Cadmium can cause damage to lungs, kidneys, and bones. Therefore, it is essential to limit the level of cadmium in fertilizers. The European Union is now considering a limit of 60 mg cadmium per kilogram of phosphorous (expressed as $P_2O_5$). However, Finland is applying an even lower limit such as 21.5 mg of cadmium per kilogram of $P_2O_5$.

The precipitation of heavy metals, such as cadmium in the nitro-phosphate process has previously been reported. U.S. Pat. No. 4,986,970 discloses a method for removal of heavy metals, especially cadmium, primarily from a mother liquor made by the Odda process, using metal salts of dithiocarbonic acid-O-esters, referred to as xanthates.

US 2004/0179984 discloses a process and compositions to remove heavy metal ions, such as cadmium, copper, lead, nickel, arsenic, manganese, zinc, and mercury ions from the wet phosphoric acid process. The process involves treating phosphoric acid prior to or after gypsum filtration with diorgano-dithiophosphinic acid (or alkali metal or ammonia salts thereof), a first diorgano-dithiophosphoric acid (or alkali metal or ammonia salts thereof) and optionally a second diorgano-dithiophosphoric acid (or alkali metal or ammonia salts thereof), precipitating metals such as cadmium, copper, lead, nickel, arsenic, manganese, zinc and mercury at a temperature from about 10 to about 85° C. and preferably in the range of about 50 to about 80° C., and separating the filtrate by either filtration or flotation.

EP 0091043 discloses the use of similar heavy metal removal agents as disclosed in US 2004/0179984 for the removal of cadmium by precipitation from the Odda process.

A problem associated to the precipitation of heavy metals is that they inevitably result in the formation of a heavy metal-containing composition as a solid composition that will in turn need to be disposed of. Such heavy metal-containing solid compositions, such as cadmium containing solid compositions, may leach out cadmium and other heavy metals thereby be harmful to the environment. In this respect, the EU Standard NS-EN 12457-2 enables one to classify solid compositions according to a leaching test procedure. Inert and non-hazardous heavy metal-containing compositions are defined in the EU Standard NS-EN 12457-2 as compositions respectively leaching less than 0.04 and from 0.04 to 2.00 ppm of cadmium, or less than 0.5 ppm and from 0.5 to 5 ppm of arsenic, or less than 2 and from 2 to 50 ppm of copper, or less than 0.01 ppm and from 0.01 to 0.5 ppm of mercury, or less than 0.4 and from 0.4 to 10 ppm of nickel, or less than 0.5 ppm and from 0.5 to 10 ppm of lead, or less than 4 and from 4 to 50 ppm of zinc, into an aqueous solution, upon treatment of the composition according to the standard and which can safely be disposed without additional precautions. On the other hand, compositions leaching more than 2 ppm of cadmium, or more than 5 ppm of arsenic, or more than 50 ppm of copper, or more than 0.5 ppm of mercury, or more than 10 ppm of nickel, or more than 10 ppm of lead, or more than 50 ppm of zinc, into an aqueous solution upon treatment of the composition according to the EU Standard NS-EN 12457-2, are to be classified as hazardous and shall require special disposal requirements. Clearly, the viability of a heavy metal extraction process, such as a cadmium extraction process, is inextricably linked to the classification (inert, non-hazardous or hazardous) of the heavy metal composition resulting from the precipitation thereof.

U.S. Pat. No. 4,762,693 discloses a method of treating a cadmium containing waste in which the waste is worked up and transformed into ecologically reliable solid matter and a heavy metal concentrate. The method of the disclosure involves adjusting the pH to values such as 8.5 or 9 in order to separate out cadmium hydroxides. However, in U.S. Pat. No. 4,986,970 it is taught that precipitation at pH 4-6 was not found to be practical because large amounts of precipitates of different phosphates then would occur. Similarly, in EP 0091043, it is taught that the treatment of mother acid in a higher pH range is impeded by the simultaneous occurrence of complex precipitates of phosphates, silica gel, calcium, magnesium, and aluminium compounds. Hence, it can be concluded that precipitation at pH values as high as 8.5 and 9.0 result in the problem of generation of high amounts of waste, including phosphates which could otherwise be used.

There exist, generally, other hazardous heavy metal compositions than compositions generated from the precipitation of cadmium from fertilizers melts and containing phosphorous. Therefore, the problem of leaching of heavy metal from heavy metal-containing compositions is to be solved for all types of hazardous cadmium-containing compositions.

Therefore, there remains the need for a solution to treat hazardous heavy metal-containing compositions, such as cadmium containing compositions, into non-hazardous heavy metal-containing compositions. Said otherwise, there remains a need to fix heavy metals in compositions arising from the precipitation of those heavy metals: not only are the heavy metals to be precipitated to allow for the production of compositions with a level sufficiently low in heavy metals, also the resulting heavy metal precipitated composition is to be non-hazardous, meaning that the heavy metals must not leach from the heavy metal composition more than stated by the regulation standards, such that it can be safely disposed of.

SUMMARY OF THE INVENTION

According to one aspect is disclosed a method for converting a solid hazardous heavy metal-containing composition, comprising one or more heavy metals, into a solid non-hazardous heavy metal-containing composition and an aqueous composition essentially free of the one or more heavy metals. The method comprises the steps of: a) mixing and dissolving the solid hazardous heavy metal-containing composition with an acid solution, thereby obtaining an hazardous heavy metal acid composition; b) precipitating the heavy metals from the hazardous heavy metal acid composition by reacting the hazardous heavy metal acid composition with a heavy metal-precipitation agent at a pH of at least 0.9, measured after a 13-fold dilution by volume using water; in particular by: measuring the pH of the acid composition after a 13-fold dilution by volume in water and adjusting the pH of the solid hazardous heavy metal-containing composition to at least 0.9 if the measured pH is below 0.9; and reacting the hazardous heavy metal acid composition with a heavy metal-precipitation agent; and c) separating out the heavy metal precipitate from the aqueous supernatant, whereby the heavy metal precipitate is the solid non-hazardous heavy metal-containing composition and the aqueous supernatant is the aqueous composition essentially free of heavy metals; wherein the heavy metal-precipitation agent comprises a diorgano-dithiophosphinic acid or the alkali metal or ammonia salts thereof, represented by Formula 1

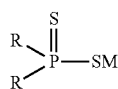

Formula 1 and wherein R is a linear or branched hydrocarbon group selected from alkyl, aryl, alkylaryl, or aralkyl, and wherein the hydrocarbon group contains 3 to 20 carbon atoms, and M is H, alkali metal or ammonia.

For the purpose of this disclosure, a hazardous heavy metal-containing composition is defined as a composition leaching more than 2 ppm of cadmium, or more than 5 ppm pf arsenic, or more than 50 ppm of copper, or more than 0.5 ppm of mercury, or more than 10 ppm of nickel, or more than 10 ppm of lead, or more than 50 ppm of zinc, into an aqueous solution upon treatment of the composition according to a simplification of the European Standard NS-EN 12457-2, using 10 l of water per kg of the composition (the "Modified EU Standard" for materials with particle size below 4 mm—as further specified below). For the purpose of this disclosure, it is sufficient to measure, using the Modified EU Standard and from a solid composition, a level of leaching of more than 2 ppm of cadmium, or more than 5 ppm pf arsenic, or more than 50 ppm of copper, or more than 0.5 ppm of mercury, or more than 10 ppm of nickel, or more than 10 ppm of lead, or more than 50 ppm of zinc, in order to characterize the solid composition as hazardous. For all practical purposes, anything that would be characterized as hazardous under the actual EU standard is likely to also be characterized as hazardous under the Modified EU Standard.

For the purpose of this disclosure, a non-hazardous heavy metal-containing composition is defined as a composition leaching 2 ppm or less of cadmium, or 5 ppm of less of arsenic, or 50 ppm or less of copper, or 0.5 ppm or less of mercury, or 10 ppm or less of nickel, or 10 ppm or less of lead, or 50 ppm or less of zinc, into an aqueous solution upon treatment of the composition according to the Modified EU Standard. For the purpose of this disclosure, it is sufficient to measure, using the Modified EU Standard and from a solid composition, a level of leaching of 2 ppm or less of cadmium, or 5 ppm of less of arsenic, or 50 ppm or less of copper, or 0.5 ppm or less of mercury, or 10 ppm or less of nickel, or 10 ppm or less of lead, or 50 ppm or less of zinc, in order to characterize the solid composition as non-hazardous. Such a composition may actually be non-hazardous or inert according to the EU Standard but for all practical purposes, all that is relevant is that the material is non-hazardous and the Modified EU Standard is sufficient for most materials.

For the purpose of this disclosure, an aqueous composition that is essentially free of heavy metals is an aqueous composition comprising less than 12 ppm, in particular less than 8 ppm, more in particular less than 4 ppm, most in particular less than 1 ppm by weight cadmium, or 5 ppm or less than arsenic, or 50 ppm or less of copper, or 0.5 ppm or less than mercury, or 10 ppm or less than nickel, or 10 ppm or less than lead, or 50 ppm or less than zinc.

Surprisingly, the inventors have found that the method of the disclosure provides a solution for converting a solid hazardous heavy metal-containing composition into a solid non-hazardous heavy metal-containing composition that can be safely disposed of: the heavy metals are more strongly fixed in the converted heavy metal-containing composition and the converted composition can, therefore, be stored without concerns of, for example under rainy conditions, the heavy metals leaching from the composition, the composition being, thereby, the source of a potential environmental hazard. In addition, the heavy metal concentration in the non-hazardous heavy metal-containing composition is higher than the heavy metal concentration in the original hazardous heavy metal-containing composition leading to the total mass and volume of the non-hazardous heavy metal-containing composition being, therefore, lower than the corresponding mass and volume of the hazardous solid heavy metal-containing composition. In other words, the method of the disclosure allows for a reduction of the amount of solid hazardous heavy metal-containing composition.

In one embodiment according to the method of the disclosure, the solid hazardous heavy-metal containing composition is characterized in that it contains heavy metals and leaches more than 2 ppm of cadmium, or more than 5 ppm of arsenic, or more than 50 ppm of copper, or more than 0.5 ppm of mercury, or more than 10 ppm of nickel, or more than 10 ppm of lead, or more than 50 ppm of zinc, according to the Modified EU Standard.

In one embodiment according to the method of the disclosure, the solid hazardous heavy metal-containing composition is a cadmium-containing composition, in particular a cadmium-containing composition that leaches more than 2 ppm cadmium into an aqueous solution, according to the Modified EU Standard, and the solid non-hazardous heavy metal-containing composition is a cadmium-containing composition, in particular a cadmium-containing composition that leaches 2 ppm or less cadmium into an aqueous solution, according to the Modified EU Standard, and the aqueous composition is essentially free of cadmium.

For the purpose of this disclosure, a hazardous cadmium-containing composition is defined as a composition leaching more than 2 ppm of cadmium into an aqueous solution, upon treatment of the composition according to a simplification of the European Standard NS-EN 12457-2, using 10 l of water per kg of the composition (the "Modified EU Standard" for materials with particle size below 4 mm—as further specified below). For the purpose of this disclosure, it is sufficient to measure, using the Modified EU Standard and from a solid composition, a level of leaching of more than 2 ppm of cadmium, in order to characterize the solid composition as hazardous. For all practical purposes, anything that would be characterized as hazardous under the actual EU standard is likely to also be characterized as hazardous under the Modified EU Standard.

For the purpose of this disclosure, a non-hazardous cadmium-containing composition is defined as a composition leaching 2 ppm or less of cadmium into an aqueous solution, upon treatment of the composition according to the Modified EU Standard. For the purpose of this disclosure, it is sufficient to measure, using the Modified EU Standard and from a solid composition, a level of leaching of 2 ppm or less of cadmium, in order to characterize the solid composition as non-hazardous. Such a composition may actually be non-hazardous or inert according to the EU Standard but for all practical purposes, all that is relevant is that the material is non-hazardous and the Modified EU Standard is sufficient for most materials.

For the purpose of this disclosure, an aqueous composition that is essentially free of cadmium is an aqueous composition comprising less than 12 ppm, in particular less than 8 ppm, more in particular less than 4 ppm, most in particular less than 1 ppm by weight cadmium.

In one embodiment according to the method of the disclosure, the acid solution has a $pK_a$ of less than 2.3.

In one embodiment according to the method of the disclosure, the solid hazardous heavy metal-containing composition further comprises from 1 to 10 weight % phosphorous and from 1 to 18 weight % calcium.

In one embodiment according to the method of the disclosure, the solid hazardous heavy-metal containing composition is the end product of a precipitation process of heavy metals, such as the Odda process.

In one embodiment according to the method of the disclosure, the solid hazardous heavy metal-containing composition further comprises from 1 to 10 weight % phosphorous and from 1 to 18 weight % calcium, or is the end product of a precipitation process of heavy metals, such as the Odda process, and the pH in step b) is adjusted is adjusted if necessary to values ranging from 0.9 to 1.6, measured after a 13-fold dilution by volume using water.

In one embodiment according to the method of the disclosure, R in Formula 1 is selected from the group consisting of cyclohexyl, isopropyl, isobutyl, n-propyl, octyl, hexyl, phenylethyl and 2,4,4 trimethylpentyl.

In one embodiment according to the method of the disclosure, the heavy metal-precipitation agent is sodium diisobutyldithiophosphinate.

In one embodiment according to the method of the disclosure, there is solid sludge in the hazardous heavy metal acid composition acid and wherein, before the precipitating step b), the step of:
  d) removing at least part of the solid sludge in the hazardous heavy metal acid composition; is performed.

In one embodiment according to the method of the disclosure, the step e) comprises the step of:
  e) adding a flocculating agent, thereby forming flocculants,
wherein the flocculating agent is added after the mixing and dissolving step a).

In one embodiment according to the method of the disclosure, the flocculating agent is added before the precipitating step b), and/or during the precipitating step b) and/or after the precipitating step b).

In one embodiment according to the method of the disclosure, the flocculating agent is added after the precipitating step.

In one embodiment according to the method of the disclosure, the flocculating agent is a cationic polymer.

According to another aspect is disclosed the use of a diorgano-dithiophosphinic acid or the alkali metal or ammonia salts thereof, for converting a solid hazardous heavy metal-containing composition into a solid non-hazardous heavy metal-containing composition and an aqueous composition essentially free of heavy metals. The diorgano-dithiophosphinic acid or the alkali metal or ammonia salts is represented by Formula 1

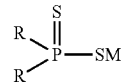

Formula 1 wherein R is a linear or branched hydrocarbon group selected from alkyl, aryl, alkylaryl, or aralkyl, and wherein the hydrocarbon group contains 3 to 20 carbon atoms, and M is H, an alkali metal or ammonia.

In one embodiment according to the use of the disclosure, the solid hazardous heavy metal-containing composition is a cadmium-containing composition, the solid non-hazardous heavy metal-containing composition is a cadmium-containing composition and the aqueous composition is essentially free of cadmium.

In one embodiment according to the use of the disclosure, R in Formula 1 is selected from the group consisting of cyclohexyl, isopropyl, isobutyl, n-propyl, octyl, hexyl, phenylethyl and 2,4,4-trimethylpentyl.

In one embodiment according to the use of the disclosure, the heavy metal-precipitation agent is sodium diisobutyldithiophosphinate.

LEGEND OF THE FIGURES

FIG. 1 shows a shaking device with a bottle containing the sample in an horizontal position (top) and a bottle containing the sample solution before shaking (bottom).

DETAILED DESCRIPTION

Throughout the description and claims of this specification, the words "comprise" and variations thereof mean "including but not limited to", and they are not intended to (and do not) exclude other moieties, additives, components, integers or steps. Throughout the description and claims of this disclosure, the singular encompasses the plural unless the context otherwise requires. In particular, where the indefinite article is used, the disclosure is to be understood as contemplating plurality as well as singularity, unless the context requires otherwise.

Features, integers, characteristics, compounds, chemical moieties, or groups described in conjunction with a particular aspect, embodiment or example of the disclosure are to be understood to be applicable to any other aspect, embodiment or example described herein unless incompatible therewith. All of the features disclosed in this disclosure (including the description, claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this disclosure (including the description, claims, abstract and drawings), or to any novel one, or any novel combination, of the steps of any method or process so disclosed.

The enumeration of numeric values by means of ranges of figures comprises all values and fractions in these ranges, as well as the cited end points. The term "ranges from . . . to" as used when referring to a range for a measurable value, such as a parameter, an amount, a time period, and the like, is intended to include the limits associated to the range that is disclosed.

The term "about" as used when referring to a measurable value, such as a parameter, an amount, a time period, and the like, is intended to represent the measurement error associated with the technique to measure such parameter, amount, time period, and the like, and is considered to be 5% or less, depending on the measurement technique used. It should be understood that the value to which the term "about" refers per se has also been disclosed.

In the present application, unless otherwise stated, the pH values are measured after a 13-fold dilution by volume with water. Stated differently, the pH value is measured after mixing one volume of a non-diluted sample with 13 volumes of water.

According to one aspect of the disclosure, a method is disclosed for converting a solid hazardous heavy metal-containing composition into a solid inert heavy metal-containing composition and an aqueous composition essentially free of heavy metals. In particular, a method is disclosed for converting a solid hazardous cadmium-containing composition into a solid inert cadmium-containing composition and an aqueous composition essentially free of cadmium.

The method of the disclosure may be applied on any solid composition containing heavy metals and leaching more than 2 ppm of cadmium, or more than 5 ppm of arsenic, or more than 50 ppm of copper, or more than 0.5 ppm of mercury, or more than 10 ppm of nickel, or more than 10 ppm of lead, or more than 50 ppm of zinc, according to the Modified EU Standard. Examples of materials that may be solid hazardous heavy metal-containing compositions include the compositions generated from the extraction of heavy metals from fertilizer liquors as described in EP 0091043, US 2004/0179984 or U.S. Pat. No. 4,762,693. Therefore, in particular, the starting material is a solid hazardous heavy metal-containing composition that may further comprise phosphorous and calcium. In particular, the starting material may contain from 1 to 10 weight % phosphorous and from 1 to 18 weight % calcium. The method may be particularly suitable for being applied on solid heavy metal-containing compositions generated from the extraction of heavy metals from fertilizer liquors comprising phosphates and calcium, such liquors being, in turn, generated by the acid digestion of phosphate rocks.

In a first step, step a), the mixing and dissolving step, the solid hazardous heavy metal-containing composition is mixed and dissolved with an acid solution. In this mixing and dissolving step, heavy metals are leached from the solid hazardous heavy metal-containing composition into the acid solution, thereby obtaining a hazardous heavy metal acid composition. A pulverization step before the mixing and dissolving step is not necessary. However, the person skilled in the art may perform such pulverization step with a view of reducing the size of the particles of the hazardous heavy metal-containing composition and, thereby, facilitating the dissolving of the particles into the acid solution. In particular embodiments, the solid hazardous heavy metal containing composition is a solid hazardous cadmium containing composition.

As defined herein, an acid solution is any solution with a $pK_a$ of 7 or less. The acid solution and the molarity of the acid solution can be selected such as to reduce the volume of the acid solution needed and to maximize the amount of heavy metals leached into the acidic composition. A decrease in the pKa, as well as an increased molarity of the selected acid solution may result in improved leaching of heavy metals from the solid hazardous heavy metal-containing composition into the aqueous acid composition. In particular, the acid solution may have a $pK_a$ of less than 2.3, more in particular less than 1.2, most in particular less than 0. In this manner, optimal decomposition of the solid hazardous heavy metal-containing composition in the mixing and leaching step is achieved. This results in the maximization of the amount of precipitated heavy metals in the precipitation step and, thereby, in the minimization of the amount of heavy metals in the aqueous composition essentially free of heavy metals.

The acid solution may be selected from a chlorous, a hypophosphorous, an iodic, a nitric, a perchloric, a periodic, a sulfamic, a tertafluoroboric, a thiocyanic, a chromic, a phosphorous, a selenic, a sulfuric, an arsenic or a pyrophosphoric acid solution. In particular, the molarity of the acid solution is in the range of 3 to 8 M, more in particular 3 to 6 M, most in particular 3.5 to 4.5 M. In particular, solutions of 2 to 8 M nitric acid or hydrochloric acid, more in particular 3 to 6 M nitric acid or hydrochloric acid, most in particular 3.5 to 4.5 M nitric acid or hydrochloric acid have been found suitable for performing the mixing and dissolving step of the method of the disclosure. By using those solutions, it has been possible to leach from 70 to 80 weight % of the total amount of heavy metals, such as cadmium, that are present in the solid hazardous heavy metal-containing composition into the acid solution, when the mixing and dissolving step was performed at temperatures from 20 to 50° C., more in particular 25 to 50° C., most in particular 35 to 45° C., for periods of time ranging from 30 minutes to 24 hours, more in particular 30 minutes to 1.5 hour, most in particular 45 minutes to one hour, and mixing 30 to 150 g, more in particular 45 to 75 g, most in particular 65 to 75 g of the hazardous heavy metal-containing composition with 100 g of the acid solution. Increasing the temperature, increasing the reaction time and decreasing the ratio of the weight of the hazardous heavy metal-containing composition over the weight of the acid solution were all found to result in increasing leaching of heavy metals into the acid solution. It is, therefore, possible to adjust the temperature, the reaction time and the weight of the acid solution used in the mixing and dissolving step, in order to achieve at least 70% of leaching of heavy metals, such as cadmium, from the hazardous heavy metal-containing composition into the acid solution.

The person skilled in the art will, furthermore, be able to readily adjust the reaction conditions in the mixing and dissolving step according to the specific type of hazardous heavy metal-containing composition as the starting material. Generally speaking the stronger the heavy metal bonds in the hazardous heavy metal-containing composition, the lower the $pK_a$ and/or the higher the molarity of the acid solution and/or the higher the temperature and/or the higher the ratio of the weight of the hazardous heavy metal-containing composition over the weight of the acid solution and/or the longer the reaction time should be.

It has been found that not necessarily all of the heavy metals present in the initial hazardous material is leached into the acid solution. As stated above, in particular, 70 to 80 weight % of the total amount of heavy metals, such as cadmium, and copper, that is present in the solid hazardous heavy metal-containing composition may leach into the aqueous acidic composition. Any heavy metals that are not leached will remain in solids, typically in small particles, and will, therefore, be separated in later steps, together with the heavy metal precipitate. This remaining solid material will be hereafter referred to as the remaining sludge. Hence, the amount of heavy metals that is not leached in the mixing and dissolving step may be part of the final solid non-hazardous heavy metal-containing composition. However, to the extent that the heavy metals did not leach during initial contact with acid in the mixing and dissolving step, remaining sludge has been found to be non-hazardous and does not affect the nature of the final non-hazardous heavy metal containing composition.

In a different embodiment according to the method of the disclosure, at least part of the remaining sludge can be removed in a pre-treatment step prior to the addition of the precipitation agent. The effect of this pre-treatment step may be to improve the efficiency of the reaction of the heavy metal precipitating agent. The separation of the sludge may be accomplished by any standard technology for separation such as, but not limited to, filtration, centrifugation, flotation or decantation. In particular, the separation may be performed by centrifugation for most effectively separating solids from the sludge.

In a second step b) according to the method of the disclosure, the precipitating step, the heavy metals from the hazardous heavy metal acid composition is precipitated by reacting the hazardous heavy metal acid composition with a heavy metal-precipitation agent at a pH of at least 0.9 (measured after a 13-fold dilution by volume using water). More in particular, the pH the pH of the hazardous heavy metal acid composition is first measured. The purpose of this step is to verify whether or not the pH value is sufficiently high for precipitation of the heavy metal precipitate to occur in the precipitating step. It has been found that in order to recover at least 80% of the heavy metals in the hazardous heavy metal-containing composition in the non-hazardous heavy metal-containing composition separated in the separating step, a pH of at least 0.9 (measured after a 13-fold dilution by volume using water) should be reached in the precipitation step. Therefore, in the pH measuring step, it measured whether or not the pH is lower than 0.9. This will depend on the $pK_a$ and on the molarity of the acid solution used in the mixing and dissolving step a).

If the pH measured in the pH measuring step is lower than 0.9 (measured after a 13-fold dilution by volume using water), the pH may be adjusted in the precipitating step. The pH may be adjusted either before or after the reaction with the heavy metal precipitating agent. Any agent suitable for increasing the pH or, in other words, any conventional chemical base such as, but non-limited to, sodium hydroxide, potassium hydroxide or ammonium hydroxide may be used for increasing the pH. However, according to an embodiment, the increase of the pH is performed using gaseous ammonia. By using gaseous ammonia, it is possible to minimize the amount of liquid, in particular water, introduced into the system. In addition, as ammonia is commonly used in various production processes, in particular the production of fertilizers, sufficient ammonia can easily be diverted for this purpose and will not cause any problems or concerns if recycled back into the fertilizer production process. Furthermore, as mentioned above, the method of the disclosure may be particularly suitable for being applied on solid heavy metal-containing compositions generated from the extraction of heavy metals from fertilizer liquors. Therefore, it is advantageous to generate an aqueous composition essentially free of heavy metals in the separating step but that may contain ammonia that can subsequently be recycled to the fertilizer production process from which the hazardous heavy metal-containing composition was generated.

When the hazardous starting material is obtained from, for example, fertilizer applications where a desired end product contains phosphorous, a potential objective would be to precipitate the heavy metals but to retain phosphorous in the aqueous supernatant. The phosphorous in the supernatant could then be recycled for further use. In the precipitation step where the pH is adjusted if necessary, a pH above 0.9 and measured after a 13-fold dilution by volume using water, allows for the efficient precipitation of the heavy metal precipitate, as discussed above. In comparison, precipitation of phosphorous has been seen to become more significant at pH values above 1.6. For example, in some embodiments, the hazardous heavy metal acid composition obtained in the mixing and dissolving step may comprise from 1 to 10 weight % phosphorous. In such embodiments, the pH in step the precipitation step may be adjusted, if necessary, to values ranging from 0.9 to 1.6 (measured after a 13-fold dilution by volume using water), from 1.2 to 1.6 (measured after a 13-fold dilution by volume using water) or from 1.4 to 1.6 (measured after a 13-fold dilution by volume using water). Using this range, a relatively high ratio of heavy metal-precipitation over phosphate precipitation can be achieved. This means that it is possible to maximize the heavy metal-precipitation such as to achieve an aqueous composition that is essentially free of heavy metals and, at the same time, minimize the amount of precipitated phosphorous. With reduced amount of phosphorous precipitating, the size of the solid non-hazardous heavy metal-containing composition that then needs to be disposed of is also reduced. Furthermore, as discussed above phosphorous recovery from the heavy metal-free aqueous composition can be particularly important for allowing the recycling of valuable phosphorous to a fertilizer process. Accordingly, in certain embodiments of the method of the present disclosure, the method further comprises the step of recovering phosphorous from the heavy metal-free aqueous composition.

The reaction with the heavy metal precipitating agent is performed in the precipitating step. According to one embodiment of the method of the disclosure, R in Formula 1 is selected from the group consisting of cyclohexyl, isopropyl, isobutyl, n-propyl, octyl, hexyl, phenylethyl and 2,4,4-trimethylpentyl. In particular, R is selected from cyclohexyl, octyl, hexyl and phenylethyl. The two R groups in Formula 1 can be the same or different.

According to one embodiment of the method, the heavy metal precipitating agent is selected from dicyclohexyl, dicyclopentyl, di(o-tolyl)phosphine, diphenyl, tert-butylphenyldithiophosphinate and the sodium and ammonium salts thereof.

According to one embodiment of the method, the heavy metal-precipitation agent is sodium diisobutyldithiophosphinate.

Generally, the heavy metal precipitating agent can be prepared according to the procedure described in U.S. Pat.

No. 4,308,214 and the corresponding examples by heating 67.2 parts of sulfur 114.8 to 284.8 parts of water to a temperature of about 70° C. To the mixture are then steadily metered in 29.5 to 64.5 of the commercially available di-phosphine. After the di-phosphine has been metered, an additional 67.5 to 193.5 additional parts of diethyl phosphine are metered in at a rate such that within the time necessary to meter in all of the diethylphosphine, 80.0 parts of a 50% solution of sodium hydroxide are also metered in at a constant rate to neutralize the corresponding dithiophosphinic acid that forms.

The dosage of the heavy metal-precipitation agent and the efficiency of heavy metal-precipitation will depend on the amount of heavy metals present in the aqueous acidic composition obtained from the mixing and the dissolving step. Generally, the higher the concentration of heavy metals, the greater will be the overall dosage of the heavy metal-precipitation agent. The person skilled in the art will be able to readily determine and establish the optimum dosage of the heavy metal-precipitation agent using no more than routine experimentation. In particular, the heavy metal-precipitation agent in the precipitating step is reacted in an amount ranging from 0.01 to 50 kg, from 0.1 kg to 10 kg or from 0.15 kg to 1.5 kg per ton of acid composition obtained in the mixing and dissolving step.

The reaction with the heavy metal precipitating agent may be performed for 3 minutes to 1.5 hour, for 5 minutes to one hour, or for 10 to 30 minutes, and at temperature ranging from 5 to 80° C., from 10 to 50° C. or from 20 to 40° C. As the heavy metal precipitate may be less stable, at temperatures above 40° C., it may be desirable to react for less than 10 minutes at higher temperatures. The person skilled in the art will be able to readily adjust the reaction conditions for reacting the heavy metal precipitating agent in order to achieve sufficient precipitation of heavy metals such as to produce an aqueous composition essentially free in heavy metals in the separating step.

The separating step, step c), may be accomplished by any standard technology for separation such as, but not limited to, filtration, centrifugation, flotation or decantation. For example, a flocculation step may be performed before the precipitating step. A flocculation step may likewise be performed before the above mentioned separation of at least part of the sludge from part of the hazardous acid heavy metal composition. This allows solids to be more effectively separated out.

In some embodiments, flocculation can also be done at the same time as, or subsequently to, adding the precipitating agent in the precipitating step. Such formation of flocculants may assist with separating the solid inert heavy metal-containing composition from the aqueous composition essentially free of heavy metals.

Flocculation may occur either before, during or after the precipitating step or in combinations thereof or, in some embodiments, there is no flocculation step. In one embodiment, a flocculation step is performed after the precipitating step.

If there is flocculation being performed at more than one step, the flocculating agent may be the same or different. A flocculation agent that can be used is, for example, a cationic polymer with a charge ranging from 20 to 60%, or from 25 to 50% or from 35 to 45%: as defined herein, a cationic polymeric flocculant is a polymer wherein from 20% to 60%, more particularly from 25% to 50%, even more particularly from 20% to 50% of the moieties making up the cationic polymeric flocculant are cationic charged moieties, an anionic polymeric flocculant wherein from 1% to 10% of the moieties making up the anionic polymeric flocculant are anionic charged moieties, or a mixture thereof. Examples of cationic polymers include, but are not limited to, 40% linear cationic powder polyacrylamide (that is a polyacrylamide having 40% of its moieties positively charged) with a molecular weight ranging from 7,1 to 9,5*$10^6$ Dalton. In particular, a polymer of acrylamide and a chloro-methylated monomer may be used.

Surprisingly, the inventors have found that the method provides a solution for converting a solid hazardous heavy metal-containing composition, such as a solid hazardous cadmium containing composition, into a solid non-hazardous heavy metal-containing composition that can be safely disposed of. In addition, the heavy metal concentration in the inert solid heavy metal-containing composition is higher than the heavy metal concentration in the solid hazardous heavy metal-containing composition and the mass and volume of the inert solid heavy metal-containing composition are, therefore, lower than the corresponding mass and volume of the hazardous solid heavy metal-containing composition. In other words, the method of the disclosure allows for a reduction of the amount of solid hazardous heavy metal-containing composition.

It has further been found that precipitation can be obtained without the addition of a precipitation agent in the precipitating step, by merely increasing the pH and at a pH of about 2, 40% of the heavy metal in the acid solution can be expected to precipitate. However, the resulting precipitated composition has been found to continue to be hazardous.

According to another aspect of the disclosure, the use for converting a solid hazardous heavy metal-containing composition into a solid non-hazardous heavy metal-containing composition and an aqueous composition essentially free of heavy metals, of the heavy metal precipitating agents of the type of Formula I described above, is disclosed.

According to one aspect of the disclosure, the application thus provides a method for converting a solid hazardous heavy metal-containing composition into a solid inert heavy metal-containing composition and an aqueous composition essentially free of heavy metals. For the purpose of this disclosure, a hazardous cadmium-containing composition is defined as a composition leaching more than 2 ppm of cadmium into an aqueous solution, upon treatment of the composition according to a simplification of the European Standard NS-EN 12457-2, using 10 l of water per kg of the composition (the "Modified EU Standard" for materials with particle size below 4 mm—as further specified below). Therefore, in another aspect of the disclosure, a method is provided to evaluate the leaching capacity of a test composition according to the Modified EU Standard as disclosed herein. This method comprises the following steps:

providing a dry solid test composition; preferably in the range of 2 to 40 g;

preparing a liquid test composition by the addition of a solvent, preferably water, to the dry solid test composition, thereby establishing a liquid-to-solid ratio of 10±0.2 l/kg;

agitating the liquid test composition for a time period between 23.5 h and 24.5 h on a shaking device; preferably wherein the agitating is performed at about 90 rpm;

after agitation, allowing settlement of the suspended solids, preferably for 15 to 20 min;

performing a first filtration step of the liquid test composition with the suspended solids; preferably said first filtration step using a filter device with a pore size between 15-18 μm;

performing a second filtration step of the filtered eluate obtained after the first filtration step, thereby using a filtration device with a pore size of about 0.8 μm;

optionally, performing a third filtration step of the filtered eluate obtained after the second filtration step, thereby using a filtration device with a pore size of about 0.45 μm; and measuring the conductivity (μs/cm), the temperature T (° C.), pH, the total dissolved solids (TDS in (g/l)) and/or the amount of one or more solids selected from As, Ba, Cd, Cr, Cu, Hg, Mo, Ni, Pb, Sb, Se, Zn, Chloride, Fluoride, Sulphate, dissolved organic carbon (DOC) in the filtered eluate obtained after the second or third filtration step;

wherein all steps are performed at a temperature range between 15° and 25° C.

EXAMPLE

All the heavy metal values provided in this Example Section were measured by ICP-OES (Thermo Scientific, iCAP 7400 Duo, wavelength: Cd: 226.502 nm; Cu: 204.379 nm; Zn: 206.200 nm, all axial mode).

Hazardous Heavy Metal Containing Composition

A heavy metal-containing composition was analysed. It comprised 7.2 weight % of phosphorous as analysed by XRF, 6.03 weight % phosphate as analysed by gravimetry, 310 ppm by weight of cadmium and leached 17 ppm of cadmium, and 75 ppm of copper when submitted to the Modified EU Standard procedure and was, therefore, classified as hazardous. This heavy metal (cadmium) containing composition is referred to as the hazardous heavy metal (cadmium) containing composition in the remaining of the Example section.

Example 1

1. Leaching of the Hazardous Heavy Metal-Containing Composition a. Leaching the Hazardous Heavy Metal Composition with Nitric Acid The freshly produced hazardous heavy metal-containing composition was directly leached by acid to demobilize the heavy metal-containing composition. The heavy metal-containing composition was treated with 4.5 M nitric acid, at 133% pulp density, meaning 133 g solid composition per 100 g acid, and stirred for 5 hours with a magnetic bar at ambient temperature.

After leaching, a centrifugation step was performed in order to separate part of the sludge from the acid composition. The composition separated from part of the sludge contained 88% of the cadmium, 88% of copper, 88% of zinc from the hazardous cadmium-containing composition.

b. Leaching the Hazardous Heavy-Metal Composition with Hydrochloric Acid

The freshly produced hazardous heavy metal-containing composition was treated with 2 M hydrochloric acid, at 75% pulp density, meaning 75 g solid composition per 100 g acid, and stirred for 1 hour with a magnetic bar at 35° C. After leaching filtering was performed in order to separate the solids and liquids. The composition separated from the solids contained 69% of Cd, 2.5% of Cu, 71% of Zn, 68% of Ni, 65% of Pb and 22% of Mn from the hazardous cadmium-containing composition.

2a Precipitation of a Non-Hazardous Heavy Metal-Containing Composition at pH 1.3 (Measured After a 13-Fold Dilution by Volume Using Water)

The pH value of the composition separated from part the sludge was measured and determined to be 1.3 using gaseous ammonia. The pH was the value measured from a sample prepared by consecutively sampling a composition for which a pH value is to be determined, weighing the amount of sampled composition, adding to the sampled composition 13 grams of water per gram of sampled composition, and mixing the added water and the sampled composition so as to make a homogenous sample. 3.6 weight % of sodium diisobutyldithiophosphinate solution in water was added to the composition with a pH value of 1.3 (measured after a 13-fold dilution by volume using water), at a ratio of 0.081 g of the sodium diisobutyldithiophosphinate solution per g of the composition. The resulting solution was then stirred for 3 minutes at 30° C. A precipitate was formed. A flocculation step was subsequently performed in order to facilitate the separation of the precipitate. A 0.1% solution of the 40% linear cationic powder polyacrylamide (that is a polyacrylamide having 40% of its moieties positively charged) with a molecular weight ranging from 7,1 to $9,5*10^6$ Dalton as the flocculant was introduced in the reaction tank at 600 rpm at a ratio of 0.003 ml polymer/g of liquor. The agitation was then reduced to 150 rpm in order to produce flocculants. The resulting flocculants were separated by vacuum filtration using Whatman filter 520A (pore size: 15-18 μm, typical thickness 300 μm, basis weight 90 g/m²).

COMPARATIVE EXAMPLES

The hazardous heavy metal-containing composition was leached according to 1a and the resulting composition was subsequently treated according to the method described in U.S. Pat. No. 4,762,693: the precipitation step was performed at pH 8.5 without sodium diisobutyldithiophosphinate.

For comparison purposes, the precipitation step 2 above was also performed adjusting the pH to 2.0 and no reaction with sodium diisobutyldithiophosphinate was performed.

Comparative Example 1

2b. Precipitation at pH 2.0 without Reaction with Sodium Diisobutyl Dithiophosphinate The pH value of the composition separated from part of the sludge was increased to 2.0. The pH was the value measured from a sample prepared by consecutively sampling a composition for which a pH value is to be determined, weighing the amount of sampled composition, adding to the sampled composition 13 grams of water per gram of sampled composition, and mixing the added water and the sampled composition so as to make a homogenous sample. The pH was adjusted using a 50% sodium hydroxide solution in water. As the pH increased, precipitation occurred along with moderate heat evolvement (40.5° C.). A precipitate was formed. The precipitate was separated by vacuum filtration using Whatman filter 520A (pore size: 15-18 μm, typical thickness 300 μm, basis weight 90 g/m²). The resulting precipitate was dried at room temperature before further characterisation.

Only 10% of the cadmium, 14% of the nickel and 6% of the zinc initially present in the composition was precipitated.

Comparative Example 2

2c. Precipitation at pH 8.5 without Reaction with Sodium Diisobutyl Dithiophosphinate The pH value of the composition separated from part of the sludge was increased to 8.5. The pH was the value measured from a sample prepared by consecutively sampling a composition for which a pH value is to be determined, weighing the amount of sampled composition, adding to the sampled composition 13 grams of water per gram of sampled composition, and mixing the added water and the sampled composition so as to make a homogenous sample. The pH was adjusted using a 50% sodium hydroxide solution in water. As the pH increased, precipitation occurred along with moderate heat evolvement (67° C.). A precipitate formed. The precipitate was separated by vacuum filtration using Whatman filter 520A (pore size: 15-18 μm, typical thickness 300 μm, basis weight 90 g/m²). The resulting precipitate was dried at room temperature before further characterisation.

Analysis

This procedure describes the stability test performed on the dry heavy metal-containing solid composition, before and after the treatment according to the method of the disclosure. The procedure is based on the Norwegian and European Standard procure "Leaching: Compliance test for leaching of granular solid composition materials and sludges Part 2: One stage batch test at a liquid to solid ratio of 10 l/kg for materials with particle size below 4 mm (without or with size reduction)." [Norsk Standard NS-EN 12457-2, 2003].

Modified EU Standard Based on the EU Standard Procedure NS-EN 12457-2

In the Modified EU Standard, the amount of composition analysed ranges from 2 to 40 g. In addition, the end-over-end tumbler with 5-10 rpm recommended in NS-EN 12457-2 is substituted for a shaking apparatus shown in FIG. 1.

1. Equipment/Apparatus

Crushing equipment (mortar)
   Sieving equipment with sieves of 4 mm nominal screen size
   Glass or high-density polyethylene bottle with caps made of inert material (for example PTFE)
   Shaking device according to FIG. 1;
   Filtering apparatus or vacuum filtration device or high-pressure filtration apparatus
   0.45 μm membrane filters for filtration
   If filtration device is not available, use syringe and syringe filters; use 0.8 μm and after first filtration use 0.45 μm (hydrophobic filter made of PTTE)
   A device for measuring electrical conductivity of eluate
   A device for measuring TDS of eluate
   A pH meters for measuring pH of eluate
   Thermometer for measuring T of eluate
   A balance 2. Reagents The dry hazardous heavy metal solid composition before and after treatment according to the method of the disclosure: originally 10 l/kg, if the amount of dry Cd solid composition is smaller use the same ratio for example 0.1 l/10 g (100 ml/10 g)
   Distilled water, demineralised water, de-ionised water of equivalent purity (5<pH<7,5) with a conductivity<0.5 mS/m. Before performing stability test, it is recommended to wash all laboratory glass, beakers to avoid contamination. Especially for conductivity measurement, since this analysis is overly sensitive

TABLE 1

| | Cadmium leaching results - example 1 and comparative examples | | | | | | | | | | | | |
|---|---|---|---|---|---|---|---|---|---|---|---|---|---|
| | Leached heavy metal conc from hazardous composition/ppm | | | Leached heavy metal conc from composition step 2/ppm | | | % recovered heavy metals after step 2 with respect to hazardous waste | | | Concentration factor of heavy metals with respect to hazardous waste | | | % phosphate composition obtained |
| Example | Cd | Cu | Zn | Cd | Cu | Zn | Cd | Cu | Zn | Cd | Cu | Zn | after step 2. |
| 1 | 17 | 75 | 22 | 0.03 | 0.6 | 12 | 76 | 75 | 47 | 96 | 100 | 63.5 | 0.6 |
| Comparative example 1 | | | | 2.97 | 1.1 | 37.2 | 10 | 14 | 6 | 0.5 | 0.2 | 1.11 | |
| Comparative example 2 | | | | 0.01 | 0.65 | 1 | 74 | 55 | 67 | 1.2 | 1.2 | 1.2 | 14.6 |

From table 1, it can be concluded that only the method of the disclosure, using a phosphinate and precipitation at pH 1.3 (measured after a 13-fold dilution by volume using water), provides all the benefits of high cadmium recovery, reduction of the amount of composition, as reflected by the concentration of cadmium in the composition treated according to the method of the disclosure, high recovery of phosphate as reflected in the low amount of phosphate in the composition treated according to the method of the disclosure, and a non-hazardous classification for the composition.

3. Testing Conditions

Test should be done at room T (20+/−5) ° C.
   Analyse water content of the dry Cd water
   Place the test portion of dry solid composition for test in a bottle, add an amount of leachant (water) establishing a liquid to solid ratio L/S=10 l/kg+/−2% or equivalent—for example 100 ml/10 g
   Place the capped bottle in the agitation device, place the bottle in horizontal position, use 90 rpm speed Agitate on shaking device in for 24 h+/−0.5 h and after 24 h, allow the suspended solids to settle for 15-20 min.

It is recommended to run a blank sample for the verification of the leaching procedure and analysis 4. Liquid-Solid Separating Step At first filter the solution with suspended solids through ceramic funnel using Whatman filter 520A (pore size: 15-18 μm, typical thickness 300 μm, basis weight 90 g/m$^2$)

Filter the eluate again using syringe filter 0.8 μm. If it is possible the eluate could be one more time filtered using 0.45 μm (hydrophobic filter made of PTTE)

Measure the volume of filtered eluate and measure amount of solids

Measure immediately conductivity in (μs/cm), T (0 C), pH and TDS (g/l) of eluate 5. Analysis Divide the eluate to an appropriate number of samples for different chemical analysis, which should be performed to establish leaching limit values according to the "Toxicity of recycled Concrete Aggregates: review on leaching tests.", The Open Construction and Building Technology Journal 2018, 12, 187-196, and Table 2:

As, Ba, Cd, Cr, Cu, Hg, Mo, Ni, Pb, Sb, Se, Zn (analysis by ICP-OES)

chloride, fluoride, sulphate (analysis by Ion Chromatography)

Dissolved Organic Carbon (analysis by LECO)

Total Dissolved Solids (Conductivity analysis using the Mettler Toledo Inlab 742 ISM electrode)

6. Leaching Limit Values for Solid Composition Acceptable in Landfills—Qualification These specifications indicate that the release of dangerous substances should be evaluated in a leaching test according to European standard EN 12457—4 "Characterization of solid composition-leaching-compliance test for leaching of granular solid composition materials and sludges—part 4: One stage batch test at a liquid to solid ratio of 10 l/kg with particle size below 10 mm, 2002."

7. Landfills for Non-Hazardous Solid Composition in Norway

Council Decision 2003/33/EC does not set any general criteria for acceptance of solid composition at landfills for non-hazardous solid composition. However, it does define and set WAC (solid composition acceptance criteria) for one specific sub-category of non-hazardous solid composition landfills, namely non-hazardous solid composition landfills or landfill cells receiving stable, non-reactive hazardous solid composition. It also specifies that gypsum-based materials can only be placed in non-hazardous solid composition landfills in cells where no biodegradable solid composition is accepted.

Norway has defined two sub-categories of non-hazardous solid composition landfills:

General landfills for non-hazardous solid composition

Non-hazardous solid composition landfills receiving stable, non-reactive hazardous solid composition.

Norway is enforcing the EU WAC for hazardous solid composition to be accepted at non-hazardous solid composition landfills receiving stable, non-reactive hazardous solid composition. From Jul. 1, 2009, a limit of 10% TOC or 20% loss on ignition will be imposed on non-hazardous solid composition to be accepted at landfills for non-hazardous solid composition. For all three classes of landfills, the solid composition must be tested both at L/S=0.1 l/kg and at L/S=10 l/kg when testing is relevant.

8. Landfills for Hazardous Solid Composition in Norway

Norway has implemented the EU WAC for granular hazardous solid composition to be landfilled at hazardous solid composition landfills.

The invention claimed is:

1. A method for converting a solid hazardous heavy metal-containing composition into a solid non-hazardous

TABLE 2

Leaching limit values (mg/kg of dry mass) for solid composition acceptable in landfills for inert, non-hazardous, and hazardous solid composition (council decision 2003/33/EC)[2].

| | Maximum Limit Values (mg/kg of dry mass) According to Classification | | | | | |
|---|---|---|---|---|---|---|
| | Inert solid composition | | Non-hazardous solid composition | | Hazardous solid composition | |
| Chemical parameters | L/S = 2 l/kg | L/kg = 10 l/kg | L/S = 2 l/kg | L/kg = 10 l/kg | L/S = 2 l/kg | L/kg = 10 l/kg |
| As | 0.1 | 0.5 | 0.4 | 5 | 6 | 25 |
| Ba | 7 | 20 | 30 | 100 | 100 | 300 |
| Cd | 0.03 | 0.04 | 0.6 | 2 | 3 | 5 |
| Cr | 0.2 | 0.5 | 4 | 20 | 25 | 70 |
| Cu | 0.9 | 2 | 25 | 50 | 50 | 100 |
| Hg | 0.003 | 0.01 | 0.05 | 0.5 | 0.5 | 2 |
| Mo | 0.3 | 0.5 | 5 | 10 | 20 | 30 |
| Ni | 0.2 | 0.4 | 5 | 10 | 20 | 40 |
| Pb | 0.2 | 0.5 | 5 | 10 | 25 | 50 |
| Sb | 0.02 | 0.06 | 0.2 | 0.7 | 2 | 5 |
| Se | 0.06 | 0.1 | 0.3 | 0.5 | 4 | 7 |
| Zn | 2 | 4 | 25 | 50 | 90 | 200 |
| Chloride | 550 | 800 | 10000 | 50000 | 17000 | 25000 |
| Fluoride | 4 | 10 | 60 | 250 | 200 | 500 |
| Sulphate | 560 | 1000 | 10000 | 20000 | 25000 | 50000 |
| DOC | 240 | 500 | 380 | 1000 | 480 | 1000 |
| TDS | 2500 | 4000 | 40000 | 60000 | 70000 | 100000 | heavy metal-containing composition and an aqueous composition essentially free of heavy metals, comprising the steps of
   a) mixing and dissolving the solid hazardous heavy metal-containing composition with an acid solution, thereby obtaining an hazardous heavy metal acid composition, wherein the solid hazardous heavy-metal containing composition is the end product of a precipitation process of heavy metals, containing heavy metals, and leaches more than 2 ppm of cadmium, or more than 5 ppm of arsenic, or more than 50 ppm of copper, or more than 0.5 ppm of mercury, or more than 10 ppm of nickel, or more than 10 ppm of lead, or more than 50 ppm of zinc, according to a Modified EU Standard NS-EN 12457-2 using 10 l of water per kg of the solid hazardous heavy metal-containing composition;
   b) precipitating the heavy metals from the hazardous heavy metal acid composition by reacting the hazardous heavy metal acid composition with a heavy metal-precipitation agent at a pH of at least 0.9, wherein the pH of the acid composition is measured after a 13-fold dilution by volume in water, and adjusting the pH of the hazardous heavy metal acid composition to at least 0.9 if the measured pH is below 0.9; and reacting the hazardous heavy metal acid composition with a heavy metal-precipitation agent, thereby forming a heavy metal precipitate and an aqueous supernatant; and
   c) separating out the heavy metal precipitate from the aqueous supernatant, whereby the heavy metal precipitate is the solid non-hazardous heavy metal-containing composition, wherein the solid non-hazardous heavy metal-containing composition leaches 2 ppm or less of cadmium into an aqueous solution, upon treatment of the solid non-hazardous heavy metal-containing composition according to the Modified EU Standard, and the aqueous supernatant is the aqueous-composition essentially free of heavy metal and comprising less than 12 ppm cadmium;
wherein the heavy metal-precipitation agent comprises a diorgano-dithiophosphinic acid or the alkali metals or ammonia salts thereof, represented by Formula 1:

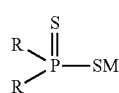

Formula 1 and wherein R is a linear or branched hydrocarbon group selected from alkyl, aryl, alkylaryl, or aralkyl, and wherein the hydrocarbon group contains 3 to 20 carbon atoms, and M is H, alkali metal or ammonia.

2. The method according to claim 1, wherein the solid hazardous heavy metal-containing composition is a solid cadmium-containing composition, and wherein the solid non-hazardous heavy metal-containing composition is a solid cadmium-containing composition, and wherein the aqueous composition is essentially free of cadmium.

3. The method according to claim 1, wherein the acid solution used in step a) has a $pK_a$ of less than 2.3.

4. The method according to claim 1, wherein the solid hazardous heavy metal-containing composition further comprises from 1 to 10 weight % phosphorous and from 1 to 18 weight % calcium.

5. The method according to claim 1, wherein the pH in step b) is adjusted if necessary to values ranging from 0.9 to 1.6, measured after a 13-fold dilution by volume using water.

6. The method according to claim 1, wherein the pH value of the aqueous composition in step c) is adjusted using gaseous ammonia.

7. The method according to claim 1, wherein R in Formula 1 is selected from the group consisting of cyclohexyl, isopropyl, isobutyl, n-propyl, octyl, hexyl, phenylethyl and 2,4,4-trimethylpentyl.

8. The method according to claim 1, wherein the heavy metal-precipitation agent is sodium diisobutyldithiophosphinate.

9. The method according to claim 1, wherein the hazardous heavy metal acid composition comprises a solid sludge, and wherein the method comprises, before the precipitating step b), the step of:
   d) removing at least part of the solid sludge in the hazardous heavy metal acid composition.

10. The method according to claim 1, wherein the method further comprises the step of:
   e) adding a flocculating agent, thereby forming flocculants, wherein the flocculating agent is added after the mixing and dissolving step a).

11. The method according to claim 10, wherein the flocculating agent is added before the precipitating step b), and/or during the precipitating step b) and/or after the precipitating step b).

12. The method according to claim 11, wherein the flocculating agent is added after the precipitating step b).

13. The method according to claim 10, wherein the flocculating agent is a cationic polymer.

14. The method of claim 1 wherein the precipitation process in step a) is the Odda process.

* * * * *